(12) United States Patent
Sim

(10) Patent No.: US 10,594,181 B2
(45) Date of Patent: Mar. 17, 2020

(54) ROTOR ASSEMBLY FOR ELECTRIC MOTOR

(71) Applicant: LG ELECTRONICS INC., Seoul (KR)

(72) Inventor: Somi Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 15/902,823

(22) Filed: Feb. 22, 2018

(65) Prior Publication Data
US 2019/0190335 A1  Jun. 20, 2019

(30) Foreign Application Priority Data
Dec. 15, 2017 (KR) .................. 10-2017-0173437

(51) Int. Cl.
| H02K 1/30 | (2006.01) |
| H02K 7/00 | (2006.01) |
| H02K 17/16 | (2006.01) |
| H02K 9/06 | (2006.01) |

(52) U.S. Cl.
CPC ............... *H02K 1/30* (2013.01); *H02K 7/003* (2013.01); *H02K 9/06* (2013.01); *H02K 17/16* (2013.01)

(58) Field of Classification Search
CPC .................. H02K 1/30; H02K 7/003
USPC .......................................... 310/91
See application file for complete search history.

(56) References Cited

U.S. PATENT DOCUMENTS

| 2002/0153783 A1* | 10/2002 | Lau ..................... H02K 1/30 310/43 |
| 2016/0315526 A1 | 10/2016 | Kaneshige et al. |
| 2017/0070127 A1* | 3/2017 | Matsumoto .............. H02K 1/28 |
| 2017/0133912 A1* | 5/2017 | Gi ......................... H02K 7/003 |

FOREIGN PATENT DOCUMENTS

| JP | 2012-222969 | 11/2012 |
| JP | 2015-116022 | 6/2015 |

OTHER PUBLICATIONS

Korean Office Action dated Dec. 15, 2017 issued in Application No. 10-2017-0173437.

* cited by examiner

*Primary Examiner* — Hanh N Nguyen
(74) *Attorney, Agent, or Firm* — KED & Associates, LLP

(57) ABSTRACT

The present invention relates to a rotor assembly for an electric motor, including: a rotor; a rotary shaft passing through the center of the rotor and coupled to the rotor; and a fastening member fastened to at least one side of the rotary shaft to prevent the rotor from being moved along the rotary shaft, wherein the fastening member includes a body portion having at least a part brought into contact with the rotary shaft; and a flange portion connected to the body portion, part of the flange portion being pressed against the rotor side to prevent the axial movement of the rotor.

11 Claims, 7 Drawing Sheets

ROTOR ASSEMBLY FOR ELECTRIC MOTOR

CROSS-REFERENCE TO RELATED APPLICATION

Pursuant to 35 USC § 119 (a), this application claims the benefit of an earlier filing date and priority to Korean Application No. 10-2017-0173437, filed on Dec. 15, 2017, the contents of which are incorporated by reference herein in its entirety.

BACKGROUND OF THE INVENTION

1. Field of the Invention

The present invention relates to a rotor assembly for an electric motor that prevents loosening of a lock nut which restricts an axial movement of a rotor.

2. Description of the Conventional Art

Generally, an electric vehicle charges an accumulator with electric energy supplied from an external source, supplies the electric energy to an electric motor coupled to the wheels during the driving, and drives the electric motor to obtain mechanical power.

The electric motor may include a stator wound with a coil and a rotor having a permanent magnet in a housing. The rotor is disposed on the inner side of the stator to face each other and is rotatable with respect to the stator about a rotary shaft.

The rotor is coupled to rotate with the rotary shaft, and the rotary shaft is connected to the wheels to rotate the wheels. When the rotor is coupled to the rotary shaft, the axial movement of the rotor along the rotary shaft must be restricted.

To this end, a stopper projects from one side of the rotary shaft and a lock nut is fastened to the other side of the rotary shaft, which makes it possible to restrict the axial movement of the rotor.

However, there is a problem that the conventional lock nut is loosened from the rotary shaft.

SUMMARY OF THE INVENTION

An object of the present invention is to provide a rotor assembly for an electric motor which can prevent loosening of a lock nut, wherein part of the lock nut is received in a hole of a rotor and caught in the circumferential direction of the rotor.

In order to achieve the above object, there is provided a rotor assembly for an electric motor, including: a rotor; a rotary shaft passing through the center of the rotor and coupled to the rotor; and a fastening member fastened to at least one side of the rotary shaft to prevent the rotor from being moved along the rotary shaft, wherein the fastening member includes a body portion having at least a part brought into contact with the rotary shaft, and a flange portion connected to the body portion, part of the flange portion being pressed against the rotor side to prevent the movement of the rotor.

In one embodiment related to the present invention, the rotor may include: a rotor core; and a plurality of rotor holes formed in the rotor core in the axial direction, wherein the flange portion may be formed to cover part of each of the plurality of rotor holes.

In one embodiment related to the present invention, part of the flange portion may be bent to form a caulking portion on at least one point, and the caulking portion of at least one point may be inserted into at least one rotor hole of the plurality of rotor holes and caught in the rotor hole.

In one embodiment related to the present invention, the outer periphery of the flange portion may be formed to cover the center part of each of the plurality of rotor holes.

In one embodiment related to the present invention, the outer periphery of the flange portion may be formed adjacent to the center of each of the plurality of rotor holes.

In one embodiment related to the present invention, part of the flange portion may be pressed to form a plurality of caulking portions, and the plurality of caulking portions may be symmetrical with respect to the centerline of the rotary shaft.

In one embodiment related to the present invention, the rotor core may include a contact portion formed at one side to contact the fastening member, and the outer periphery radius of the body portion may be equal to or smaller than that of the contact portion.

In one embodiment related to the present invention, part of the flange portion may be pressed in the axial direction of the rotor hole, with the fastening member fastened to the rotary shaft.

In one embodiment related to the present invention, the pressing point of each caulking portion may be formed between a first point and a second point along the circumferential direction of the flange portion, wherein the first point may be the center of the rotor hole and the second point may be the outer end of the rotor hole in the loosening direction of the fastening member in the circumferential direction of the flange portion.

In one embodiment related to the present invention, a ratio of the bending depth d of the flange portion to the thickness t of the flange portion may be 0.3 to 4.0.

In one embodiment related to the present invention, a degree C. of covering the rotor hole with the flange portion may range from 10% to 90%, and $C=100\times W/(W+H)$ (%), wherein W is a smaller value of W1 and W2, W1 is a width of the flange portion, W2 is a distance by which the flange portion projects from the contact portion of the rotor core to the rotor hole along the radial direction, and H is an interval from the outermost end of the flange portion to the inner circumferential surface of the rotor hole along the radial direction.

In one embodiment related to the present invention, the fastening member may be a lock nut.

The effects of the rotor assembly for the electric motor according to the present invention will now be described.

First, after the lock nut is fastened to the rotary shaft, part of the lock nut is press-fit into the rotor hole by the caulking operation, so that the lock nut can be fixed to the rotor and prevented from being loosened from the rotary shaft.

Second, the flange portion is provided at the lower end of the body portion of the lock nut, and four points of the flange portion are press-fit into the rotor holes at the same time, which leads to an increased coupling force between the lock nut and the rotor.

Third, the four pressing points of the flange portion are symmetrically disposed with respect to the diametrical centerline of the rotor to maintain a balance with respect to a pressing resistance.

Fourth, the bending depth of the flange portion is controlled in relation to the thickness of the flange portion in the caulking operation, to prevent the flange portion from being torn.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE PREFERRED EMBODIMENTS

Figure 1:
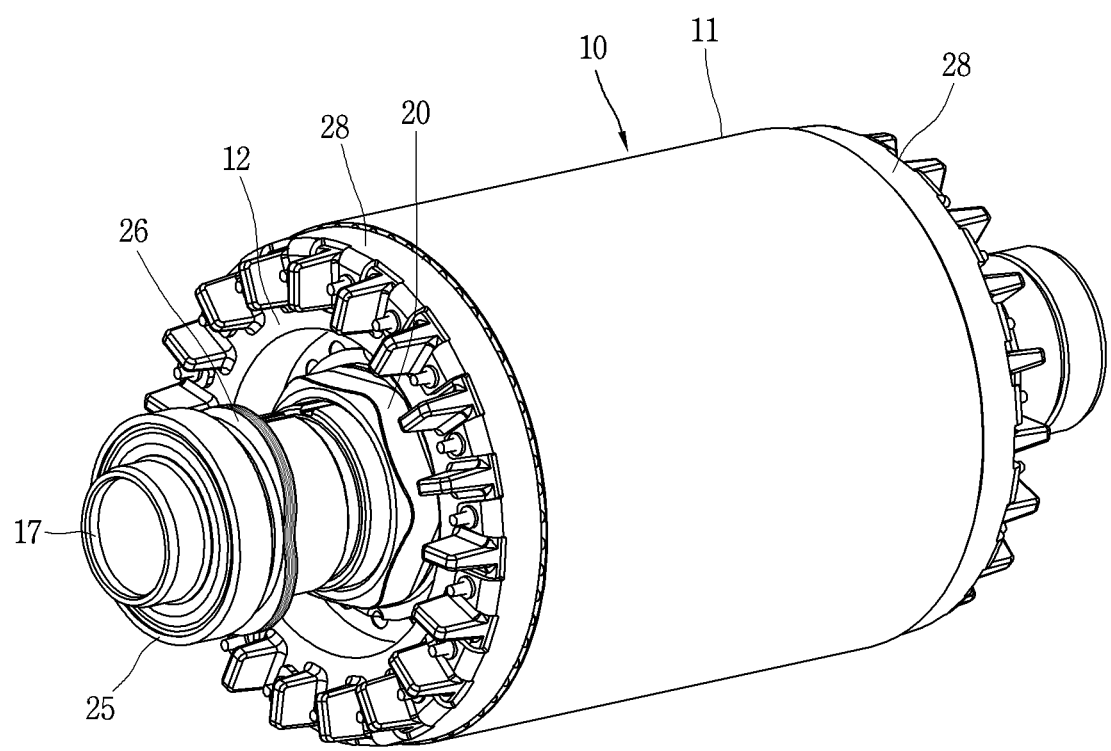
FIG. 1 is a perspective view showing a rotor assembly for an electric motor according to the present invention.

Hereinafter, embodiments of the present invention will be described in detail with reference to the accompanying drawings, wherein like reference numerals are used to designate identical or similar elements throughout the drawings, and a repeated description thereof will be omitted. The terms "module" and "portion" for the elements used in the following description are given or mixed in consideration of the ease of the specification and do not have their own meaning or role. In addition, in the following description of the embodiments of the present invention, a detailed description of the conventional arts will be omitted when it is determined that the subject matter of the embodiments disclosed herein may be obscured. Also, it is to be understood that the accompanying drawings are intended only to provide a better understanding of the embodiments of the present invention, and are not intended to limit the technical ideas disclosed in the present invention and are intended to cover all modifications, equivalents and alternatives included in the technical ideas and scope of the present invention.

Terms including ordinals, such as first, second, etc., may be used to describe various elements, but the elements are not limited to these terms. The terms are used only for the purpose of distinguishing one element from another.

It is to be understood that when an element is referred to as being "connected" or "coupled" to another element, they may be directly connected or coupled to each other element or indirectly connected to each other with another element therebetween. On the other hand, when an element is referred to as being "directly connected" or "directly coupled" to another element, it should be understood that there is no other element between them.

The singular forms include plural forms, unless the context clearly dictates otherwise.

In the present application, the terms "include", "have" and the like are used to specify the presence of a feature, an integer, a step, an operation, an element, a component, or a combination thereof, but do not preclude the presence or addition of one or more other features, integers, steps, operations, elements, components, or combinations thereof.

Figure 2:
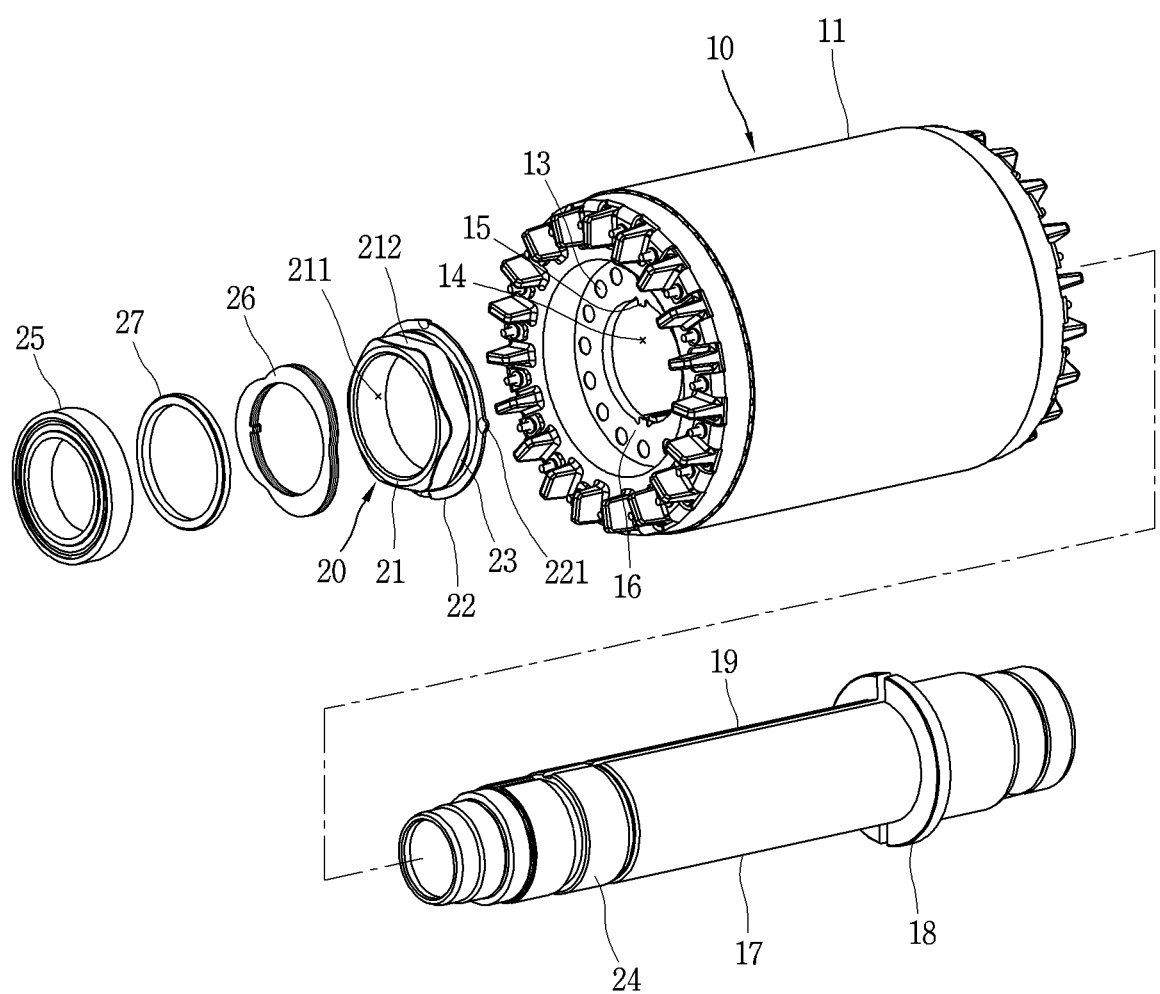
FIG. 2 is an exploded perspective view showing the rotor assembly of FIG.
Figure 3:
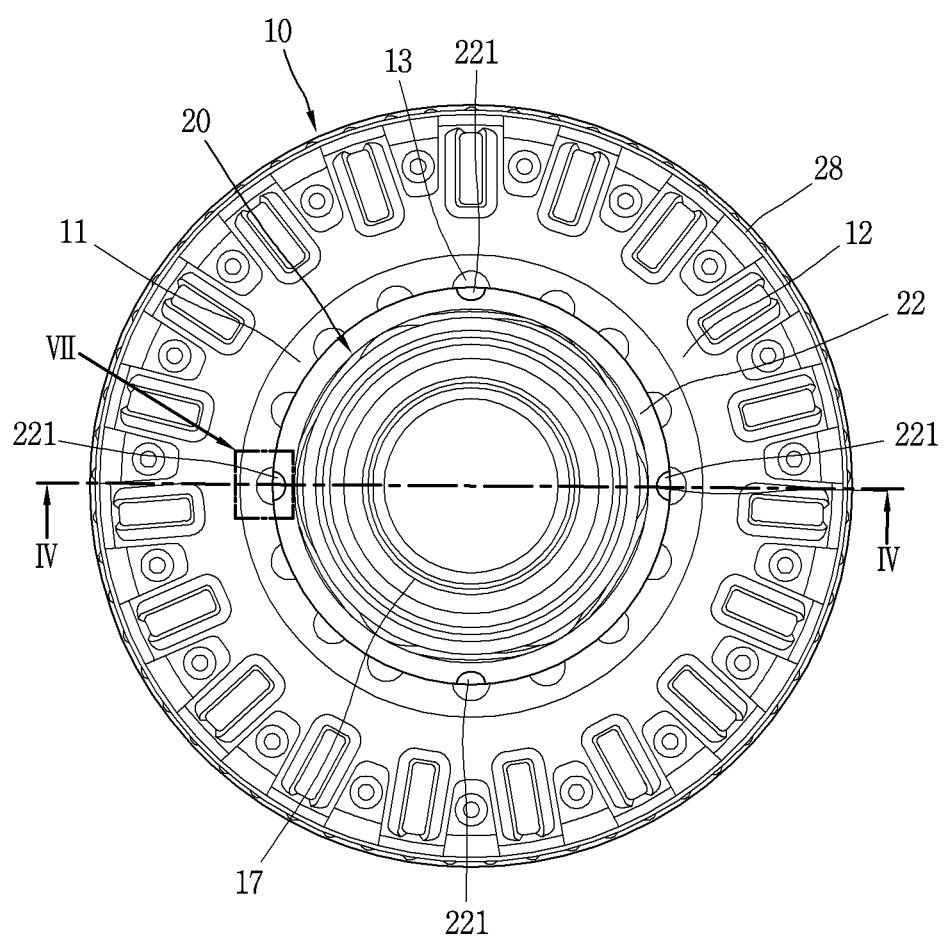
FIG. 3 is a front view of the rotor assembly of FIG. 1 when seen in the axial direction.
Figure 4:
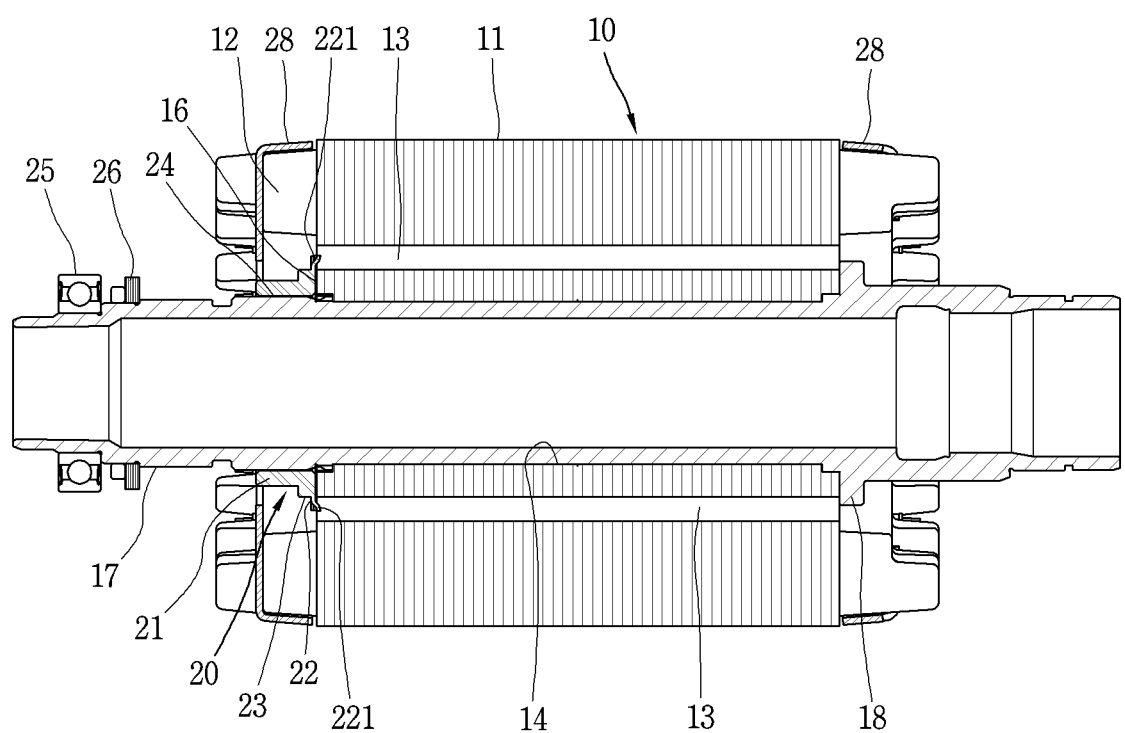
FIG. 4 is a sectional view taken line IV-IV of FIG. 3.

FIG. 1 is a perspective view showing a rotor 10 assembly for an electric motor according to the present invention, FIG. 2 is an exploded perspective view showing the rotor 10 assembly of FIG. 1, FIG. 3 is a front view of the rotor 10 assembly of FIG. 1 when seen in the axial direction, and FIG. 4 is a sectional view taken line IV-IV of FIG. 3.

The electric motor of the present invention includes a stator (not shown) and the rotor 10. The electric motor is driven using electric energy as a power source and mounted in a vehicle to actuate wheels.

The rotor 10 may be provided on the inner side of the stator. The rotor 10 is rotatable with respect to the stator.

The rotor 10 assembly for the electric motor according to the present invention includes the rotor 10, a rotary shaft 17, and a fastening member.

The rotor 10 may be composed of a rotor core 11 and a rotor winding.

The rotor core 11 can be assembled by stacking a plurality of steel plates along the axial direction of the rotary shaft 17. A plurality of slots may be disposed in the rotor core 11 at intervals along the circumferential direction of the rotor core 11.

The rotor winding may include a plurality of conductor bar portions received in the plurality of slots and an end ring portion 12 formed to be energizable at both ends of the plurality of conductor bar portions.

A deformation restriction portion 28 is formed in a ring shape to be closely attached to the outer surface of the end ring portion 12 and is made of a material having a smaller coefficient of thermal expansion than that of the end ring portion 12 to restrict the end ring portion 12 from being outwardly deformed along the radial direction of the rotor core 11.

A rotary shaft hole 14 is formed in the center of the rotor core 11 to extend along the axial direction. A plurality of keys 15 project from both sides of the rotary shaft hole 14 along the axial direction so as to guide the rotary shaft 17 inserted into the rotary shaft hole 14. The keys can restrict the rotor core 11 from slipping in the rotary direction on the rotary shaft 17.

A key groove 19 is formed in one side of the outer circumferential surface of the rotary shaft 17 to extend in the axial direction, so that the key 15 of the rotor core 11 can be inserted into the key groove 19 in the axial direction. On the contrary, the key 15 and the key groove 19 may be opposite. That is, the key 17 may be formed on the rotary shaft 17 and the key groove 19 may be formed in the rotary core 11, performing the same role.

The rotary shaft 17 may pass through the center of the rotor 10 via the rotary shaft hole 14 and may be coupled to the rotor 10. The rotary shaft 17 may be formed in a hollow shape.

A stopper 18 may project from one side of the rotary shaft 17 in the radial outward direction. As the rotor 10 is caught by the stopper 18, the one side axial movement thereof can be restricted.

A fastening member may be fastened to at least one side of the rotary shaft to restrict the rotor from being moved in the axial direction along the rotary shaft.

The fastening member may be a lock nut 20.

The lock nut 20 may be fastened to the other side of the rotary shaft 17 to restrict the rotor 10 from being moved in the other side axial direction along the rotary shaft 17 from the stopper 18.

A threaded portion 24 is formed on the other side of the rotary shaft 17 so that the lock nut 20 can be fastened thereto, and the threaded portion 24 is spaced apart from the stopper 18 in the axial direction. In order to restrict the axial movement of the rotor 10, the distance between the threaded portion 24 and the stopper 18 is equal to the axial length of the rotor core 11.

The rotary shaft 17 is inserted into the rotary shaft hole 14 of the rotor core 11 until one end of the rotor core 11 is caught by the stopper 18, then the lock nut 20 is fastened to the threaded portion 24 of the rotary shaft 17, to thereby restrict the other side axial movement of the rotor core 11.

A plurality of rotor holes 13 are provided between the slots of the rotor core 11 and the rotary shaft hole 14, which leads to the light weight of the rotor core 11. The plurality of rotor holes 13 are formed in the rotor core 11 along the axial direction of the rotary shaft 17 and spaced apart along the circumferential direction of the rotor core 11. Each of the plurality of rotor holes 13 may be formed in a circular shape.

A bearing mounting portion may be provided on the other side of the rotary shaft 17 to be spaced apart from the lock nut 20 along the axial direction, and a bearing 25 may be mounted on the other side of the rotary shaft 17 to rotatably support the rotary shaft 17.

A rotor resolver 26 and an anti-separation ring 27 may be provided between the bearing 25 and the lock nut 20 to fit into the other side of the rotary shaft 17. The rotor resolver 26 can be used to control the rotary angle of the rotor 10. The anti-separation ring 27 may be configured to prevent the rotor resolver 26 from being separated from the rotary shaft 17.

Figure 5:
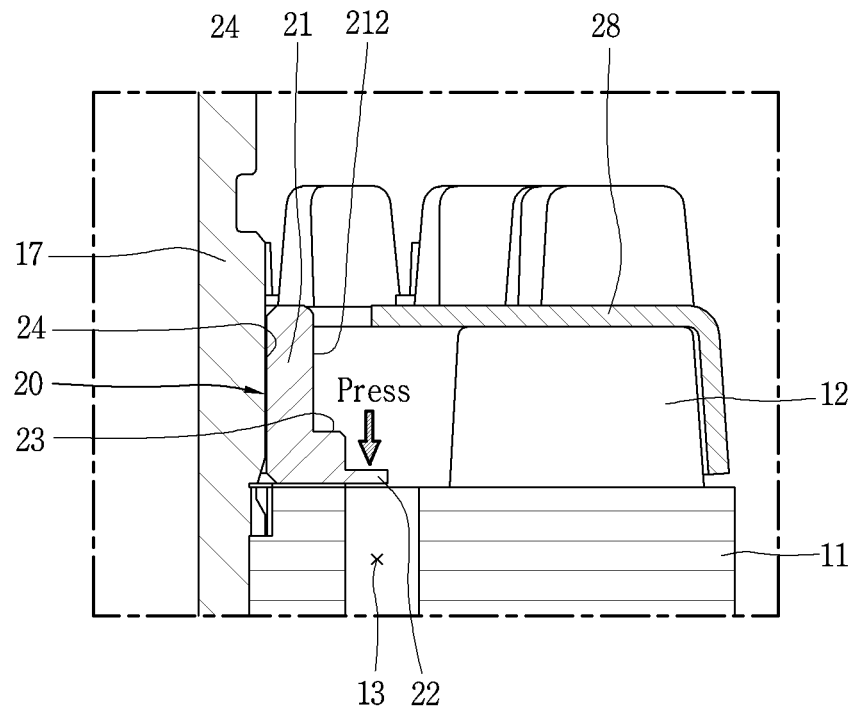
FIG. 5 is a partial enlarged view of the rectangular box part of FIG. 4 showing a flange portion before being pressed.
Figure 6:
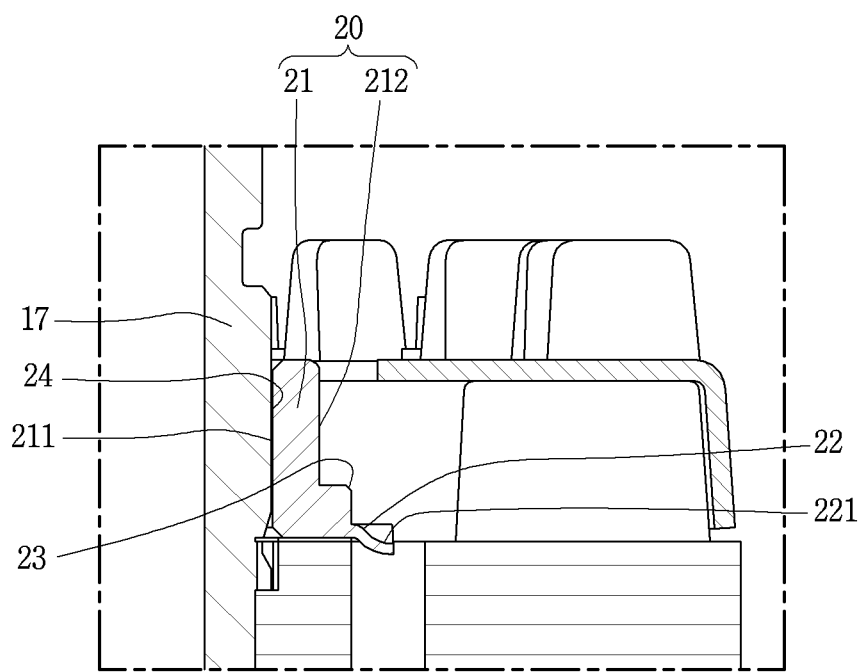
FIG. 6 is a partial enlarged view showing the flange portion after being pressed.

FIG. 5 is a partial enlarged view of the rectangular box part of FIG. 4 showing a flange portion 22 before being pressed and FIG. 6 is a partial enlarged view showing the flange portion 22 after being pressed.

The lock nut 20 includes a body portion 21 and the flange portion 22.

A circular receiving hole 211 having the same size as the rotary shaft hole 14 is formed on the inner side of the body portion 21, so that the rotary shaft 17 can pass through the receiving hole 211. An internally-threaded portion (not shown) is formed on the inner side of the body portion 21 and screwed to the threaded portion 24 of the rotary shaft 17.

A hexagonal outer side portion 212 is formed on the outer side of the body portion 21 to be rotated using a tool such as a hexagonal wrench to tighten or loosen the lock nut 20

Part of the flange portion 22 is pressed against the rotor 10 side to prevent the rotor 10 from being moved in the axial direction.

The flange portion 22 is configured to be coupled to the rotor 10 to prevent loosening of the lock nut 20 and thus prevent the axial movement of the rotor 10. Part of the flange portion 22 is pressed by a caulking operation to increase a coupling force with the rotor 10. In the present specification, the caulking operation refers to an operation of pressing part of the flange portion 22 using pressing projections of a jig to be bent into the plurality of rotor holes 13.

The flange portion 22 projects from one end of the body portion 21 in the radial outward direction. The radially outwardly projecting flange portion 22 extends from one end of the body portion 21 in the circumferential direction. Part of the flange portion 22 is pressed in the axial direction of the rotary shaft 17 and brought into contact with the rotor 10 to prevent loosening of the lock nut 20. The loosening of the lock nut 20 indicates rotation of the lock nut 20 in the opposite direction to the fastening direction.

Part of the flange portion 22 may be formed to cover part of each of the plurality of rotor holes 13.

Part of the flange portion 22 may form at least one caulking portion 221 pressed and bent in the axial direction of the rotary shaft 17. The caulking portion 221, i.e., the bent part of the flange portion 22 is received in the rotor hole 13.

Accordingly, when a rotary force is applied to the caulking portion 221 received in the rotor hole 13 in the circumferential direction of the rotor core 11, the caulking portion 221 is caught in the rotor hole 13 of the rotor core 11, which prevents the lock nut 20 from being loosened along the circumferential direction of the rotor core 11.

The flange portion 22 is incorporated into one end of the body portion 21 and made of a material having a certain strength such as the same metal as that of the body portion 21 to maintain the bending shape.

The caulking portion 221 may be formed on at least one point of the flange portion 22. A plurality of caulking portions 221 may be spaced apart along the circumferential direction of the flange portion 22. For example, the number of the caulking portions 221 may be 3 to 6.

The jig may have a plurality of pressing projections. The plurality of pressing projections may be formed in a circular or cylindrical shape to press part of the flange portion 22 on at least one point.

The plurality of pressing projections may be spaced apart in the circumferential direction of the rotor core 11 and each of them may extend along the axial direction. The plurality of pressing projections may be connected by a connecting rod extending from one hub in the radial direction.

After the lock nut 20 is fastened to the rotary shaft 17, each of the plurality of pressing projections presses a few points of part of the flange portion 22 at the same time against the plurality of rotor holes 13 in the axial direction to thereby form the plurality of caulking portions 221.

When the rotor 10 assembly is seen in the axial direction, each of the plurality of caulking portions 221 pressed by the pressing projections are preferably symmetrically disposed with respect to the diametrical centerline of the flange portion 22. As such, it is possible to maintain a balance with respect to a pressing resistance in pressing the flange portion 22.

In this embodiment, by way of example, there are four caulking portions 221. In this case, the four caulking portions 221 are spaced apart at an interval of 90° along the circumferential direction of the rotor core 11.

In addition, if the number of the caulking portions 221 is an odd number, e.g., 3 or 5, one of the five caulking portions 221 may be disposed on the virtual diametrical centerline of the flange portion 22, and the other caulking portions 221 may be symmetrically disposed with respect to the centerline.

A contact portion 16 may be provided at one side of the rotor core 11 to contact the lock nut 20, so that when the lock nut 20 is fastened to the rotary shaft 17, it can be closely attached to the contact portion 16 of the lock nut 20. The contact portion 16 is disposed between the rotor holes 13 of the rotor core 11 and the rotary shaft hole 14.

The receiving hole 211 of the body portion 21 may communicate with the rotary shaft hole 14 of the rotor core 11 and the outer periphery of the body portion 21 may be disposed between the rotary shaft hole 14 and the rotor holes 13. That is, the outer periphery radius of the body portion 21 is preferably equal to or smaller than that of the contact portion 16.

If the outer periphery radius of the body portion 21 is large enough to cover part of the rotor holes 13, the radial width of the flange portion 22 decreases, which makes it difficult to bend the flange portion 22. Therefore, the width of the flange portion 22 should be large enough to be pressed by the pressing projections.

The outer periphery of the flange portion 22 is preferably formed to cover the center part of each of the plurality of rotor holes 13. More preferably, the outermost part of the flange portion 22 is adjacent to the center of each of the plurality of rotor holes 13.

Figure 7:
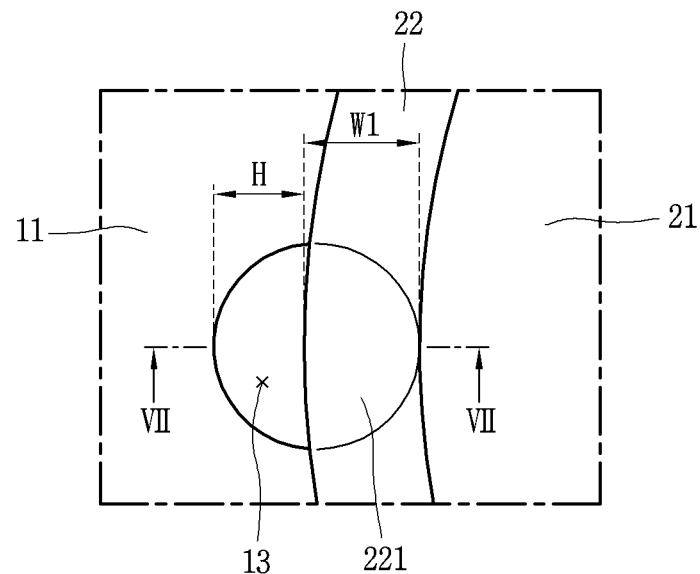
FIG. 7 is a partial enlarged view of VII part of FIG. 3.
Figure 8:
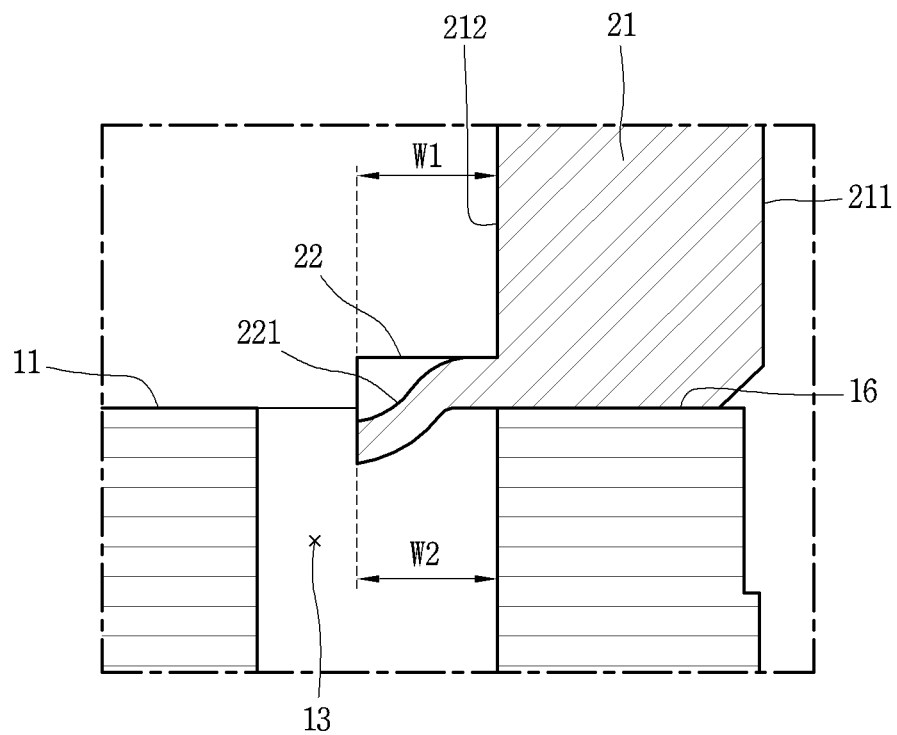
FIG. 8 is a sectional view taken along line VIII-VIII of FIG. 7.

FIG. 7 is a partial enlarged view of VII part of FIG. 3 and FIG. 8 is a sectional view taken along line VIII-VIII of FIG. 7.

A degree C. of covering the rotor hole 13 with the flange portion 22 ranges from 10% to 90%. More preferably, C ranges from 50% to 60%.

$$C=100 \times W/(W+H)(\%)$$

W is a smaller value of W1 and W2. W1 denotes a width of the flange portion 22 (a distance from the outer side surface of the body portion to the end of the flange portion 22 along the radial direction), and W2 denotes a distance by which the flange portion 22 projects from the contact portion 16 of the rotor core 11 to the rotor hole 13 along the radial direction.

H denotes an interval from the outermost end of the flange portion 22 to the inner circumferential surface of the rotor hole 13.

If the outermost end of the flange portion 22 covers the plurality of rotor holes 13 too much or too little, the bending (caulking operation) of the flange portion 22 becomes difficult due to a resistance increase in pressing the flange portion 22.

A connecting portion where the body portion 21 and the flange portion 22 intersect with each other in the vertical direction is bent at a right angle and the flange portion 22 having a relatively smaller thickness than the body portion 21 is weak in strength. Accordingly, a reinforcing portion 23 may be formed thicker than the flange portion 22 outside the intersecting part of the body portion 21 and the flange portion 22.

The reinforcing portion 23 adds on a corner portion between the body portion 21 and the flange portion 22 to improve strength, so that the flange portion 22 can maintain a shape extending in the radial direction with respect to the body portion 21.

Figure 9:
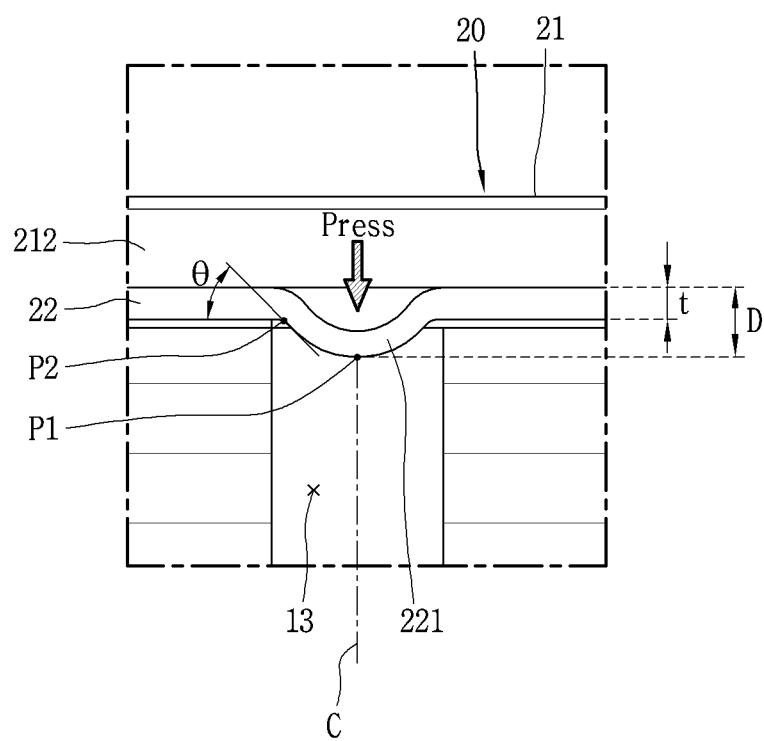
FIG. 9 is a concept view showing a pressing point of the flange portion of FIG. 6.

FIG. 9 is a concept view showing a pressing point of the flange portion of FIG. 6.

When the same pressing force is applied, the bending depth of the flange portion 22 increases toward the center part C of the rotor hole 13 and decreases away from the center part C of the rotor hole 13 (toward the outer end of the rotor hole 13 in the circumferential direction of the rotor core 11) due to an increase in the pressing resistance. Accordingly, the pressing point of the flange portion 22 is preferably directed toward the center of the rotor hole 13 to maximize the bending depth of the flange portion 22 with a small pressing force.

Meanwhile, in order to prevent the lock nut 20 from being loosened, the lock nut 20 needs only to be restricted from being rotated along the circumferential direction of the flange portion 22. Therefore, the greater the bending angle of the flange portion 22 bent from the outer end of the rotor hole 13 into the rotor hole 13, the less likely the lock nut 20 is loosened along the circumferential direction of the flange portion 22.

Here, the bending angle θ is an angle between the contact portion 16 of the rotor core 11 and an inclined surface of the caulking portion 221 bent into the rotor hole 13.

Thus, the more the bending angle θ is, the more the lock nut 20 is restricted from being loosened.

In order to increase the bending angle θ, it is possible to increase the bending depth of the caulking portion 221 or to position the pressing point of the pressing projection close to the outer edge of the rotor hole 13 along the circumferential direction of the flange portion 22.

However, when the bending depth increases, the flange portion 22 may be torn due to plastic deformation as its thickness decreases.

In order to prevent the flange portion 22 from being torn, the bending depth of the flange portion 22 (or the caulking portion 221) in relation to the thickness of the flange portion 22 is important.

As shown in the following table, a ratio of the bending depth (maximum depth) of the caulking portion 221 to the thickness of the flange portion 22 is preferably 0.3 to 4.0. If the ratio of the bending depth to the thickness of the flange portion 22 is smaller than 0.3, the lock nut 20 may be loosened, and if it is greater than 4, the flange portion 22 may be torn.

|  | Thickness of flange portion (mm) | Bending depth (mm) | Ratio (Bending depth/Thickness of Flange portion) |
| --- | --- | --- | --- |
| Example 1 | 1.3 | 1.5 | 1.2 |
| Example 2 | 0.5 | 1.5 | 3.0 |
| Example 3 | 5 | 1.5 | 0.3 |
| Example 4 | 1.3 | 5 | 3.8 |
| Example 5 | 1.3 | 0.5 | 0.4 |
| Selection of Ratio |  | 0.3 < Ratio < 4 |  |

Meanwhile, the pressing projection of the jig may be formed in a circular shape. The pressing projection has a smaller diameter than the rotor hole 13. Assuming that the pressing projections have the same diameter, as the pressing point of the caulking portion 221 becomes closer to the outer end of the rotor hole 13 in the loosening direction of the lock nut 20 along the circumferential direction of the flange portion 22 from the center of the rotor hole 13, the bending angle may increase. However, as the pressing point becomes closer to the outer end of the rotor hole 13, the pressing force of the pressing projection increases.

Here, the pressing point of the caulking portion 221 may be pressed between a first point P1 and a second point P2. The first point P1 is the center part C of the rotor hole 13 and the second point P2 is the outer end of the rotor hole 13 along the loosening direction of the lock nut 20 in the circumferential direction of the flange portion 22.

Therefore, according to the present invention, after the lock nut 20 is fastened to the rotary shaft 17, part of the lock nut 20 is press-fit into the rotor hole 13 by the caulking operation, so that the lock nut 20 can be fixed to the rotor 10 and prevented from being loosened from the rotary shaft 17.

In addition, the flange portion 22 is provided at the lower end of the body portion 21 of the lock nut 20, and four points of the flange portion 22 are press-fit into the rotor holes 13 at the same time, which leads to an increased coupling force between the lock nut 20 and the rotor 10.

Moreover, the four pressing points of the flange portion 22 are symmetrically disposed with respect to the diametrical centerline of the rotor 10 to maintain a balance with respect to a pressing resistance.

Further, the bending depth of the flange portion 22 is controlled in relation to the thickness of the flange portion 22 to prevent the flange portion 22 from being torn.

Furthermore, the degree of covering part of the rotor hole 13 with the flange portion 22 is controlled to minimize a bending resistance of the flange portion 22.

What is claimed is:

1. A rotor assembly for an electric motor, comprising:
   a rotor;
   a rotary shaft passing through a center of the rotor and coupled to the rotor; and
   a fastening member fastened to at least one side of the rotary shaft to prevent the rotor from being moved along the rotary shaft,
   wherein the fastening member includes a body portion having at least a part brought into contact with the rotary shaft, and a flange portion connected to the body portion, part of the flange portion being pressed against a side of the rotor to prevent movement of the rotor,
   wherein the rotor comprises:
      a rotor core; and
      a plurality of rotor holes formed in the rotor core in an axial direction,
      wherein the flange portion is formed to cover part of each of the plurality of rotor holes.

2. The rotor assembly of claim 1, wherein part of the flange portion is bent to form a caulking portion on at least one point, and the caulking portion of at least one point is inserted into at least one rotor hole of the plurality of rotor holes and caught in the rotor hole.

3. The rotor assembly of claim 2, wherein a pressing point of each caulking portion is formed between a first point and a second point along a circumferential direction of the flange portion,
   wherein the first point is a center of the rotor hole and the second point is an outer end of the rotor hole in a loosening direction of the fastening member in the circumferential direction of the flange portion.

4. The rotor assembly of claim 1, wherein an outer periphery of the flange portion is formed to cover a center part of each of the plurality of rotor holes.

5. The rotor assembly of claim 1, wherein an outer periphery of the flange portion is formed adjacent to a center of each of the plurality of rotor holes.

6. The rotor assembly of claim 1, wherein the rotor core comprises a contact portion formed at one side to contact the fastening member, and an outer periphery radius of the body portion is equal to or smaller than that of the contact portion.

7. The rotor assembly of claim 1, wherein part of the flange portion is pressed in the axial direction of the rotor hole, with the fastening member fastened to the rotary shaft.

8. The rotor assembly of claim 7, wherein a ratio of a bending depth d of the flange portion to a thickness t of the flange portion is 0.3 to 4.0.

9. The rotor assembly of claim 1, wherein a degree C. of covering the rotor hole with the flange portion ranges from 10% to 90%, and $$C=100\times W/(W+H) \ (\%),$$

wherein W is a smaller value of W1 and W2, W1 is a width of the flange portion, W2 is a distance by which the flange portion projects from a contact portion of the rotor core to the rotor hole along a radial direction, and H is an interval from an outermost end of the flange portion to an inner circumferential surface of the rotor hole along the radial direction.

10. The rotor assembly of claim 1, wherein the fastening member is a lock nut.

11. A rotor assembly for an electric motor, comprising:
    a rotor;
    a rotary shaft passing through a center of the rotor and coupled to the rotor; and
    a fastening member fastened to at least one side of the rotary shaft to prevent the rotor from being moved along the rotary shaft,
    wherein the fastening member includes a body portion having at least a part brought into contact with the rotary shaft, and a flange portion connected to the body portion, part of the flange portion being pressed against a side of the rotor to prevent movement of the rotor,
    wherein part of the flange portion is pressed to form a plurality of caulking portions, and the plurality of caulking portions are symmetrical with respect to a centerline of the rotary shaft.

* * * * *